United States Patent
Kawano et al.

[11] Patent Number: 5,640,211
[45] Date of Patent: Jun. 17, 1997

[54] LUMINANCE SIGNAL/COLOR SIGNAL SEPARATOR CIRCUIT

[75] Inventors: Mitsumo Kawano; Takahiro Kusano, both of Saitama-ken, Japan

[73] Assignee: Kabushiki Kaisha Toshiba, Japan

[21] Appl. No.: 186,527

[22] Filed: Jan. 26, 1994

[30] Foreign Application Priority Data

Jan. 26, 1993 [JP] Japan ................... 5-011018

[51] Int. Cl.$^6$ ................... H04N 9/78
[52] U.S. Cl. ................... 348/663; 348/665; 348/667
[58] Field of Search ................... 348/663, 665, 348/666, 667, 712, 713; 358/31; H04N 9/78

[56] References Cited

U.S. PATENT DOCUMENTS 5,155,582  10/1992  Tokoi ................... 348/663

FOREIGN PATENT DOCUMENTS

| 241935 | 10/1987 | European Pat. Off. . |
| 5335320 | 4/1978 | Japan . |
| 6394793 | 4/1988 | Japan . |
| 4-17485 | 1/1992 | Japan . |
| 435488 | 2/1992 | Japan . |

*Primary Examiner*—Sherrie Hsia
*Attorney, Agent, or Firm*—Banner & Witcoff, Ltd.

[57] ABSTRACT

A luminance signal/color signal separator circuit having an input terminal and luminance and color output terminals includes a comb filter connected between the input terminal and the color output terminal; an amplitude detector having an input connected to the color output terminal; a filter having a first input connected to the input terminal and a second input connected to an output of the amplitude detector; and a combiner having an output connected to the luminance output terminal, a first input connected to the input terminal and a second input connected to an output of the filter. The separator circuit processes a composite signal which includes an original luminance signal and an original color signal. The filter passes a gain controlled color band signal. A signal at the luminance output terminal includes a signal component characterized by an amplitude in a color band frequency range, and the combiner outputs the signal having a signal component amplitude as (1) a first amplitude when the original color amplitude is small, and (2) a second amplitude when the original color amplitude is large, the first amplitude being greater than the second amplitude.

10 Claims, 7 Drawing Sheets

LUMINANCE SIGNAL/COLOR SIGNAL SEPARATOR CIRCUIT

BACKGROUND OF THE INVENTION

1. Field of the Invention

This invention concerns luminance signal/color signal separator circuits used in devices which process the picture signals of color television receivers, video tape recorders, etc.

2. Description of Related Art

In devices which process the picture signals of color television receivers, video tape recorders (hereafter, VTR), etc., a complex composite signal, in which the luminance signal (hereafter, Y signal) and the color signal (hereafter, C signal) were previously mixed to form the complex composite signal, is used as the video signal. The Y signal and the C signal have to be separated from this type of video signal. This separation is called Y/C separation.

FIG. 3 is a graph of the frequency spectrum of this type of video signal. The vertical axis expresses amplitude, and the horizontal axis expresses frequency. In FIG. 3, the Y signal in the video signal has a frequency spectrum or range of from 0 to about 4.5 MHz. The C signal also has a specified band, referred to herein as the C-band, about a color secondary carrier wave frequency of 3.58 MHz (the secondary carder wave is a substantially pure narrow band signal within the C-band of the spectrum). The Y signal and the C signal have an interleaved relationship, and they are to be separated, spectrum-wise, for example, 1.5 MHz at the low band side of 3.58 MHz and 0.5 MHz at the high band side.

FIG. 4 is a block diagram showing a simple luminance signal/color signal separator circuit which separates the Y signal and the C signal from this type of video signal. In FIG. 4, 41 is an input terminal to which video signal a2 is supplied. Video signal a2 is supplied to band-pass filter (hereafter, BPF) 42 and low-pass filter (hereafter LPF) 43. BPF 42 passes the C-band component of video signal a2 including the color secondary carder wave and all other signals in the C-band frequencies which are present on video signal a2. By this means, BPF 42 extracts and supplies C signal b2 to C signal output terminal 44. LPF 43 passes a low band component of video signal a2 having frequencies lower than the frequencies of the C-band component on video signal a2. By this means, LPF 43 extracts and supplies Y signal c2 to Y signal output terminal 45.

FIG. 5 is a graph showing the C signal b2 output from BPF 42. The vertical axis expresses amplitude, and the horizontal axis expresses frequency. As shown, C signal b2 output from BPF 42 covers the C-band component of video signal a2.

FIG. 6 is a graph showing the Y signal c2 output from LPF 43. The vertical axis expresses amplitude, and the horizontal axis expresses frequency. As shown, Y signal c2 output from LPF 43 covers a low band component of video signal a2 having frequencies lower than frequencies of the C-band component.

When using this type of luminance signal/color signal separator circuit, all frequency components in the original video signal in the frequency range about the C-band component is eliminated from Y signal c2 output from Y signal output terminal 45, and a broad-band luminance signal cannot be obtained. Therefore, Y signal c2 has a narrower spectrum than the original Y signal, and therefore, the horizontal resolution of a display of Y signal c2 is lower compared to a display of the original Y signal when the picture is displayed on a screen. Also, C signal b2 contains those components of the original Y signal having frequency components falling in the C-band about the color secondary carrier wave frequency, those components, constituting noise, remaining as a residual Y signal in C signal b2 output from C signal output terminal 44. This residual Y signal interferes with subsequent signal processing.

FIG. 7 is a block diagram showing a luminance signal/color signal separator circuit which uses a C signal comb filter circuit. In FIG. 7, 51 is an input terminal to which video signal a3 is supplied. Video signal a3 is supplied to BPF 52 and, at the same time, to a first input terminal of subtractor 53. BPF 52 passes the C-band component of video signal a3 including the color secondary wave and all signals in the C-band frequencies which are present on video signal a3. By this means, BPF 52 extracts and supplies C signal b3 to C signal comb filter circuit 54. Comb filter circuit 54 eliminates the residual Y signal from C signal b3 by using Y signal line correlation. Then comb filter circuit 54 supplies purified C signal c3 to a second input terminal of subtractor 53 and, at the same time, to C signal output terminal 55. Subtractor 53 produces purified Y signal d3 by subtracting purified C signal c3 from video signal a3, and supplies purified Y signal d3 to Y signal output terminal 56.

FIG. 8 is a block diagram showing C signal comb filter circuit 54 in FIG. 7. In FIG. 8, 61 is an input terminal to which C signal b3 is supplied from BPF 52. C signal b3 is supplied to "one horizontal scanning cycle" delay circuit (hereafter, 1H delay circuit) 62 and, at the same time, to a first input terminal of subtractor 63. 1H delay circuit 62 delays C signal b3 from input terminal 61 by a 1H delay and supplies this delayed signal to gain control circuit 64 as 1H delay color signal e3. Gain control circuit 64 controls the amplitude of 1H delay color signal e3 and supplies this to a second input terminal of subtractor 63 as gain controlled 1H delay color signal f3. Subtractor 63 produces purified C signal c3 by subtracting gain controlled 1H delay color signal f3 from C signal b3, and supplies this to output terminal 66.

FIG. 9 is a graph showing the gain property of C signal comb filter circuit 54. The vertical axis expresses gain, and the horizontal axis expresses frequency. As shown in FIG. 9, the gain of C signal comb filter circuit 54 takes a comb-shape in frequency.

FIG. 10 is an enlargement along the horizontal axis of portion A in FIG. 9. As shown in FIG. 10, when the frequency of the C signal is an integral multiple of the 1H frequency (i.e., fH=1/1H), the amplitude property of C signal comb filter circuit 54 takes a minimum value. When the frequency of the C signal is a frequency based on fH/2 being added to an integral multiple of the 1H frequency (i.e., fH=1/1H), the amplitude property takes a maximum value.

Thus, a frequency component in a signal input to C signal comb filter circuit 54 having a frequency equal to an integral multiple of the 1H frequency (i.e., fH=1/1H), is attenuated. However, a frequency component of a signal having a frequency equal to fH/2 added to an integral multiple of the 1H frequency (i.e., fH=1/1H) passes through C signal comb filter circuit 54 with hardly any attenuation. For this reason, video signal a3, supplied to input terminal 51 in FIG. 7, is also supplied to the second input terminal of subtractor 53 as purified C signal c3 from which the residual Y signal has been eliminated by passing through BPF 52 and C signal comb filter circuit 54.

FIG. 11 is a graph showing purified C signal c3. The vertical axis expresses amplitude, and the horizontal axis expresses frequency. Purified C signal c3, output from C signal comb filter circuit 54, has a comb type property in which the residual Y signal has been eliminated from the C-band frequencies of signals passing through BPF 52. Subtractor 53 produces purified Y signal d3 by subtracting purified C signal c3 from video signal a3, and supplies purified Y signal d3 to Y signal output terminal 56.

FIG. 12 is a graph showing purified Y signal d3. The vertical axis expresses amplitude and the horizontal axis expresses frequency. Purified Y signal d3, output from subtractor 53, from which the original C signal component (at the color secondary wave frequency) in the C-band frequencies has been eliminated, is in an interleaved relationship with purified C signal c3 shown in FIG. 11. By this means, the luminance signal/color signal separator circuit of FIG. 7 leaves the residual Y signal component within the C-band frequencies in purified Y signal d3. Thus, the band can be sufficiently purified.

When using this type of luminance signal/color signal separator circuit, the Y signal can be sufficiently purified. At the same time, the residual Y signal can be removed from the C signal. However, this construction obtains the Y signal by subtracting the C signal, which has passed through the series connection of a band-pass filter and a C signal comb filter circuit, from a video signal. The BPF is a high-order filter and its gain randomness and phase randomness are large. Thus, it is necessary to accurately control both the gain and phase together with the gain randomness of the C signal comb filter circuit. For this reason, it is difficult to minimize the manufacturing cost of equipment which includes such a luminance signal/color signal separator circuit.

In the above described luminance signal/color signal separator circuit, the band of the luminance signal can be sufficiently purified. At the same time, the residual luminance signal can be eliminated from the C signal. However, the BPF required is a high-order filter, and its gain randomness and phase randomness are large. Thus, it is necessary to accurately control both the gain and the phase together with the gain randomness of the C signal comb filter circuit. As a result, it is difficult to minimize the manufacturing cost of equipment which include this type of luminance signal/ color signal separator circuit.

It is an object of the present invention to eliminate the above problem. It is another object to provide a luminance signal/color signal separator circuit which obtains a broadband luminance signal without the series connection of a band-pass filter and a C signal comb filter circuit and, at the same time, is capable of eliminating any residual luminance signal from the C signal.

In Japanese laid open patent 4-17485 the Y signal is separated from the composite signal by adding a composite signal to a 1H delayed composite signal (since the phase of the C signal is inverted every 1H delay) and the C component remaining mixed in the Y signal is removed by eliminating a specific band of frequencies about 3.58 MHz when the separated C signal has a high saturation level. However, the 4-17485 Japanese laid open patent does not use a band pass filter or disclose the Y signal being extracted by combining a composite signal with a specified C band component of the composite signal.

SUMMARY OF THE INVENTION

These and other objects are achieved in a separator circuit having an input terminal and first and second output terminals wherein the separator circuit includes a color comb filter connected between the input terminal and the second output terminal; an amplitude detector having an input connected to the second output terminal; a filter having a first input connected to the input terminal and a second input connected to an output of the amplitude detector; and a combiner having an output connected to the first output terminal, a first input connected to the input terminal and a second input connected to an output of the filter. The separator circuit processes a composite signal at the input terminal into luminance and color signals. The composite signal includes an original luminance signal characterized by a luminance signal amplitude and a luminance frequency range in combination with an original color signal characterized by a color signal amplitude and a color frequency range. The filter passes a gain controlled color band signal characterized by a color band frequency range. An output signal at the luminance output terminal includes a signal component characterized by a component frequency range contained within the color band frequency range. The combiner outputs the output signal having an amplitude of the signal component as (1) a first component amplitude when the color signal amplitude is small, and (2) a second component amplitude when the color signal amplitude is large, the first component amplitude being greater than the second component amplitude.

BRIEF DESCRIPTION OF THE DRAWINGS

The invention will be described in detail in the following description of preferred embodiments with reference to the following figures wherein.

DETAILED DESCRIPTION OF PREFERRED EMBODIMENTS

The following is a description of an embodiment of this invention with reference to the drawings.

Figure 1:
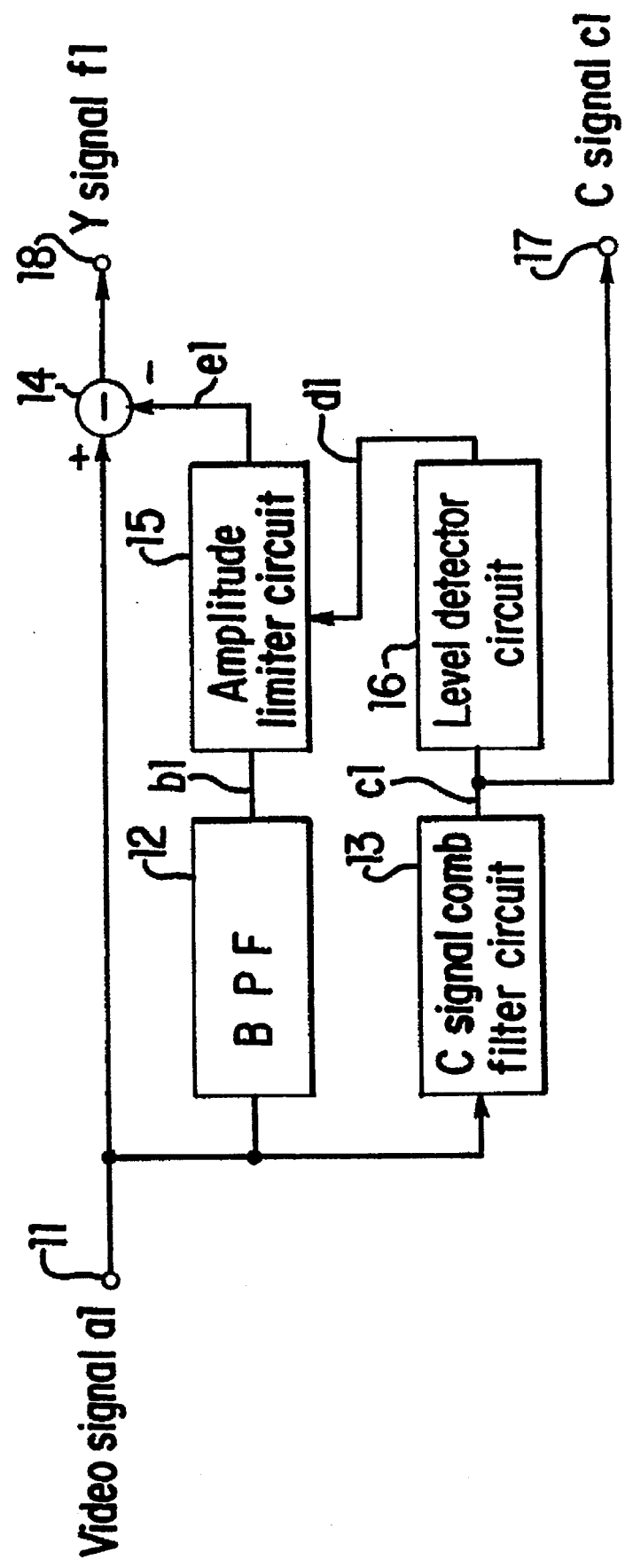
FIG. 1 is a block diagram showing an embodiment of the luminance signal/color signal separator circuit of this invention.

FIG. 1 is a block diagram showing an embodiment of the luminance signal/color signal separator circuit of the present invention. In FIG. 1, 11 is an input terminal to which video signal a1 is supplied. Video signal a1 is supplied to BPF 12 and C signal comb filter circuit 13 with an additional filter function to roughly remove low band components and, at the same time, it is supplied to a first input terminal of subtractor 14.

C signal comb filter circuit 13 produces purified C signal c1 by eliminating the Y signal components from video signal a1 using Y signal line correlation. Then C signal comb filter circuit 13 supplies purified C signal c1 to amplitude detector circuit 16 and, at the same time supplies purified C signal c1 to C signal output terminal 17. Amplitude detector circuit 16 detects the amplitude of purified C signal c1 from C signal comb filter circuit 13, and supplies detection signal d1, which expresses this detection result, to amplitude limiter circuit 15.

BPF 12 extracts C-band signal b1 by passing the C-band component of video signal a1 including the color secondary carrier wave and all other signals in the C-band frequencies which are present on video signal a1, and supplies this C-band component to amplitude limiter circuit 15. Amplitude limiter circuit 15 controls the gain applied to C-band signal b1 so as to produce gain controlled C-band signal e1 based on detection signal d1 by limiting the amplitude of C-band signal b1. The output of amplitude limiter circuit 15 is supplied to a second input terminal of subtractor 14 as gain controlled C-band signal e1. Subtractor 14 produces purified Y signal f1 by subtracting gain controlled C-band signal e1 from video signal a1, and supplies this to Y signal output terminal 18.

The following is a description of the operation of this embodiment. Video signal a1, input to input terminal 11, is processed to become purified C signal c1 from which the Y signal component is eliminated by passing through C signal comb filter circuit 13, and is output from C signal output terminal 17. By this means, purified C signal e1 is obtained from video signal a1.

Amplitude detector circuit 16 detects the amplitude of purified C signal c1 and supplies detection signal d1 which expresses this detection result, to amplitude limiter circuit 15. The C-band signal b1 is extracted from video signal a1 by passing through BPF 12. The C-band signal b1 in this case includes the color secondary carrier wave and other signals in the C-band frequencies which are present in video signal a1.

When the amplitude of the original C signal in video signal a1 is large, amplitude detector circuit 16 detects that the amplitude of purified C signal e1 is large, and detection signal d1 controls amplitude limiter circuit 15 to limit the amplitude of C-band signal b1 by controlling gain (e.g., attenuating) applied to C-band signal b1 so as to produce a large amplitude gain controlled C-band signal e1. By this means, purified Y signal f1 from subtractor 14 is a Y signal in which both the C-band component of the original Y signal and the original C signal are greatly reduced.

When the amplitude of the original C signal in video signal a1 is small, amplitude detector 16 detects that the amplitude of purified C signal c1 is small. Then detection signal d1 controls amplitude limiter circuit 15 to limit the amplitude of the C-band signal b1 by controlling the gain (e.g., attenuating) applied to C-band signal b1 so as to produce a small amplitude gain controlled C-band signal e1. Thus, only a small amplitude signal for the gain controlled C-band signal e1 is required. Since the amplitude of the gain controlled C-band signal e1 is small, the original C signal in video signal a1 will be attenuated in purified Y signal f1 from subtractor 14 while the original Y signal in video signal a1 is not substantially attenuated.

Figure 2:
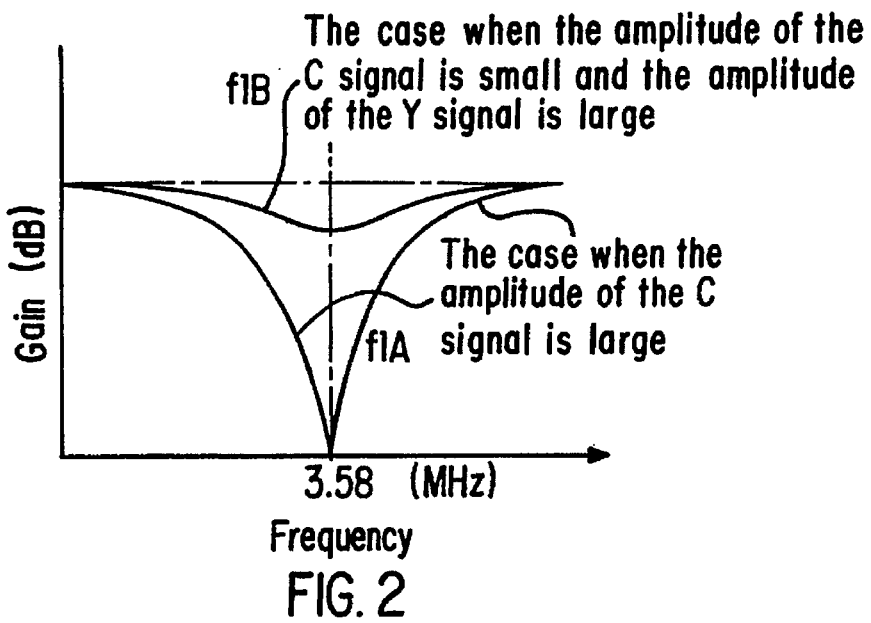
FIG. 2 is a graph showing the Y signal gain property of the luminance signal/color signal separator circuit subtractor in FIG. 1.
Figure 3:
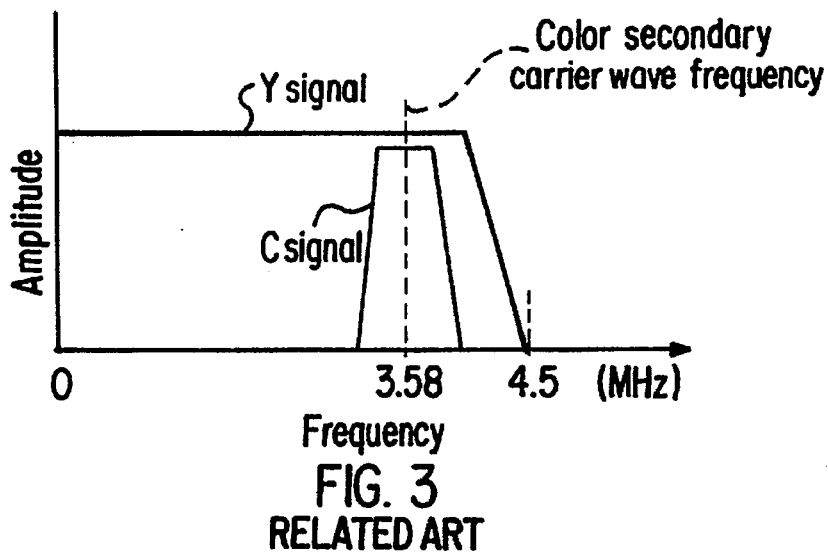
FIG. 3 is a graph showing a typical video signal input to a related art luminance signal/color signal separator circuit.
Figure 4:
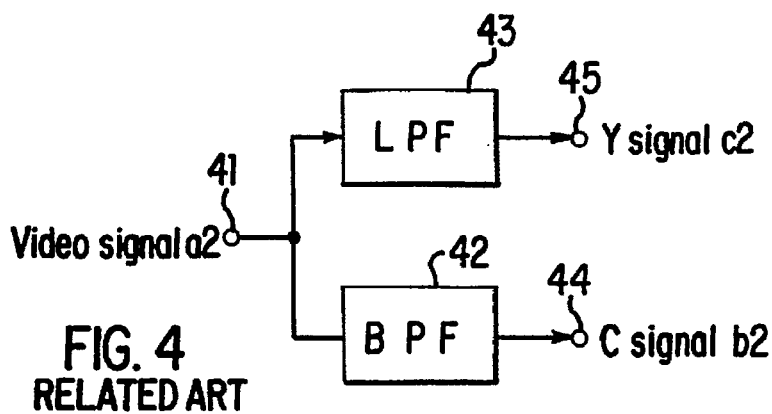
FIG. 4 is a block diagram illustrating a simple luminance signal/color signal separator circuit.
Figure 5:
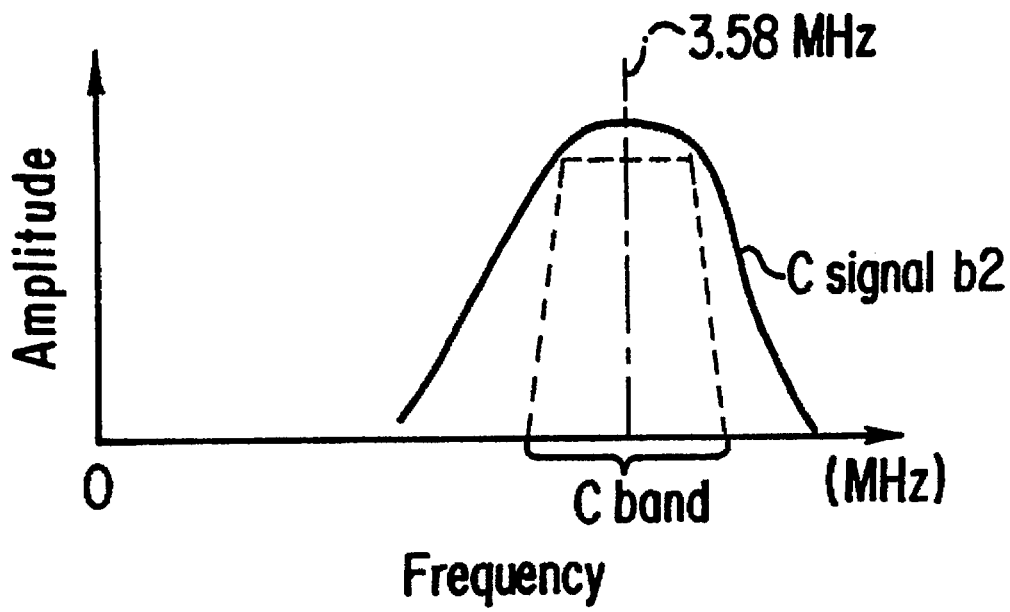
FIG. 5 is a graph showing the C signal output from the BPF in FIG. 4.
Figure 6:
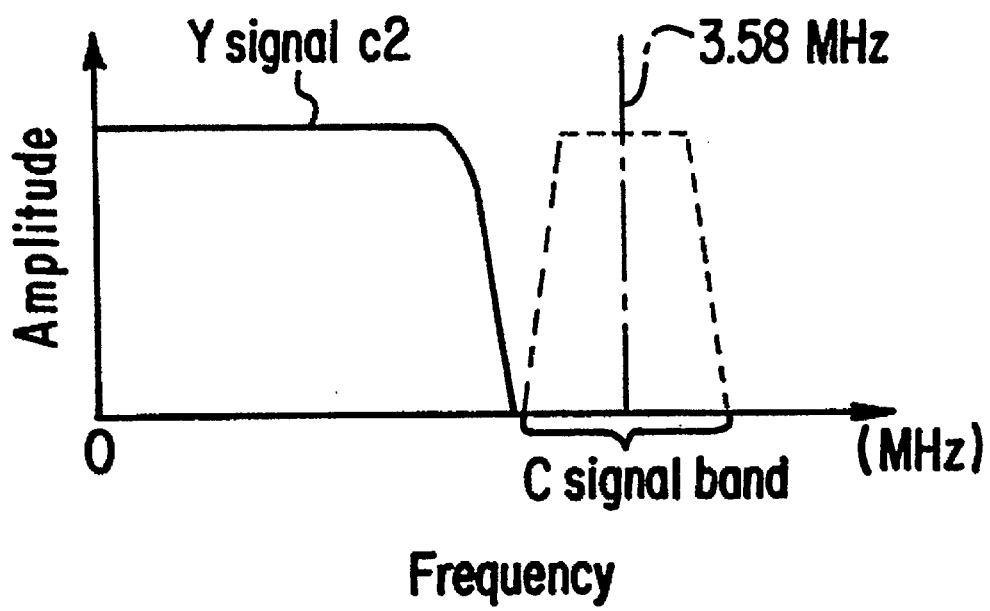
FIG. 6 is a graph showing the Y signal output from the LPF in FIG. 4.
Figure 7:
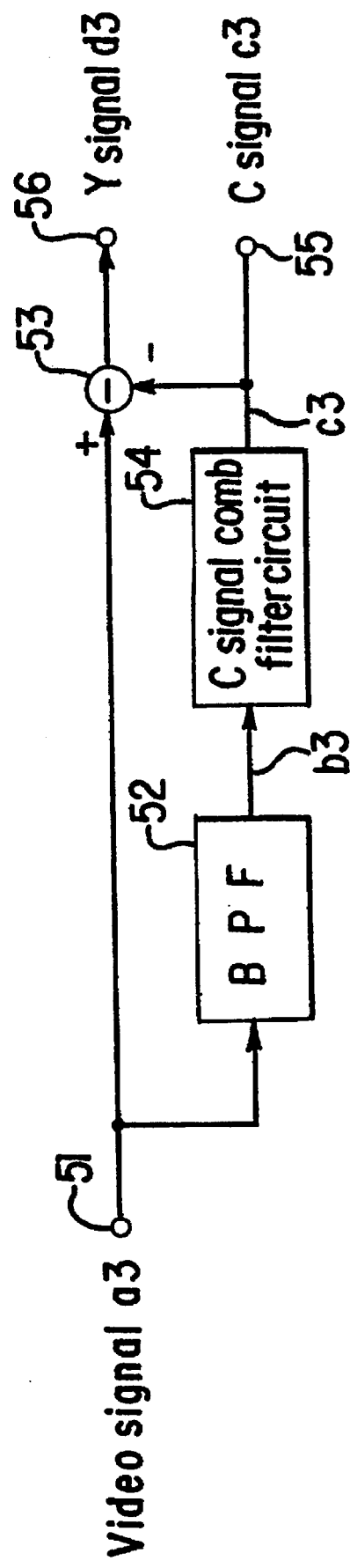
FIG. 7 is a block diagram showing a related art luminance signal/color signal separator circuit in which a C signal comb filter circuit is used.
Figure 8:
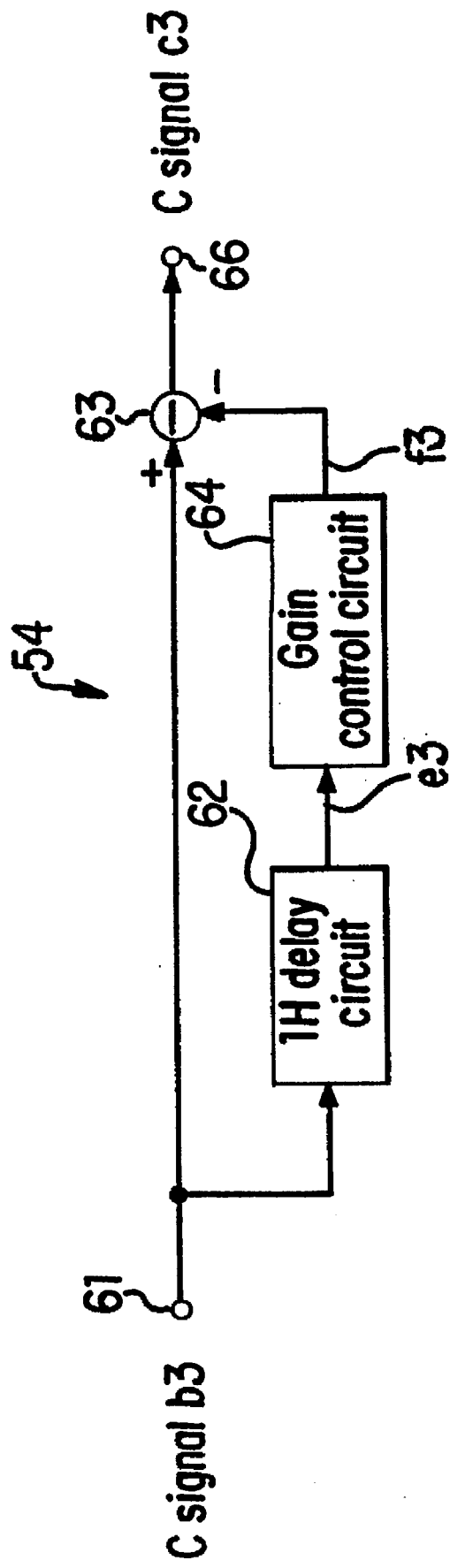
FIG. 8 is a block diagram showing the C signal comb filter circuit used in the circuit of FIG. 7.
Figure 9:
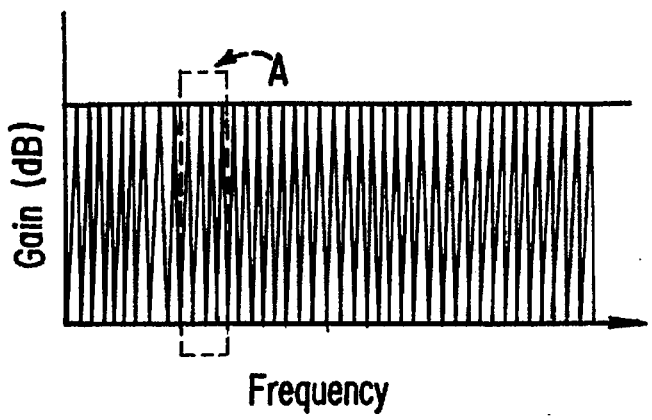
FIG. 9 is a graph showing the gain property of the C signal comb filter circuit in FIG. 7.
Figure 10:
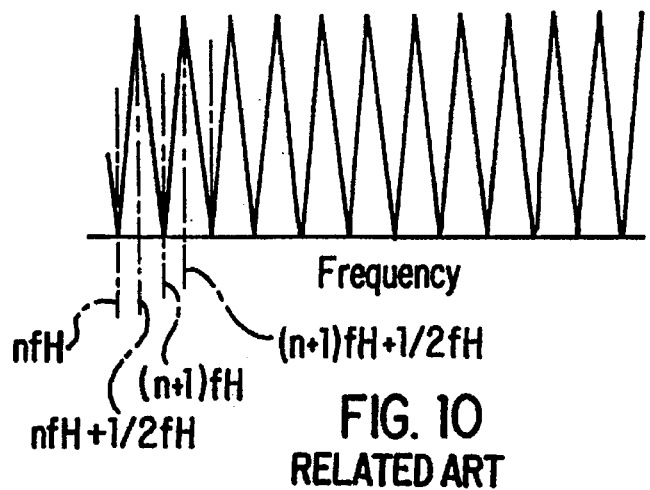
FIG. 10 is an enlargement drawing in which portion A of FIG. 9 is expanded on the horizontal axis.
Figure 11:
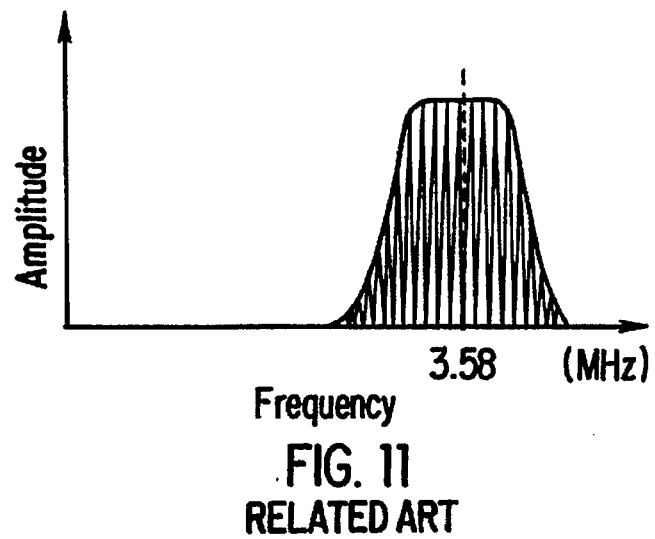
FIG. 11 is a graph showing the C signal from the C signal output terminal in FIG. 7.
Figure 12:
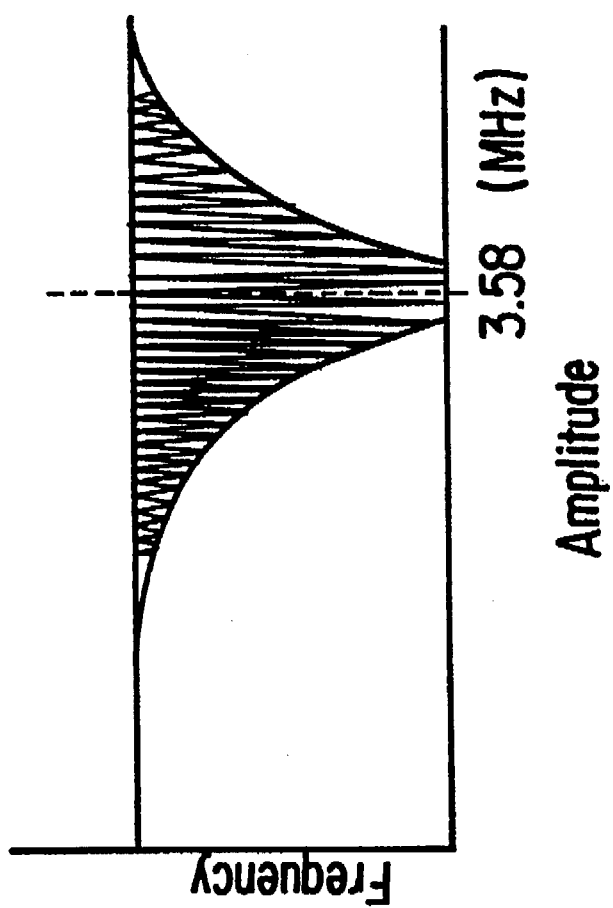
FIG. 12 is a graph showing the Y signal from the Y signal output terminal in FIG. 7.

FIG. 2 is a graph showing the gain property of the luminance signal/color signal separator circuit with respect to the output of purified Y signal f1 from subtractor 14. The vertical axis expresses gain, and the horizontal axis expresses frequency. As shown at f1A in FIG. 2, when the amplitude of the original C signal in video signal a1 is large, both the C-band component of the original Y signal and the original C signal are greatly reduced in purified Y signal f1 by subtractor 14. Therefore, signals over the entire C-band centered on the color secondary carrier wave frequency (3.58 MHz) is greatly attenuated. As shown at f2B in FIG. 2, when the amplitude of the original C signal in video signal a1 is small and the amplitude of the C-band component of the original Y signal in video signal a1 is large, the original C signal is reduced from purified Y signal f1; however, the C-band component of the original Y signal is not greatly reduced, and other signals, except the color secondary carrier wave, in the C-band centered on 3.58 MHz are not greatly attenuated.

When using this embodiment, purified C signal c1 from which the C-band component of the original Y signal has been sufficiently eliminated is obtained from C signal output terminal 17. At the same time, when the amplitude of the original C signal is small in video signal a1, purified Y signal f1, in which the C-band component of the original Y signal is little attenuated, is obtained from Y signal output terminal 18. By this means, a picture with little color reproduction distortion and color noise is obtained. At the same time, when the amplitude of the original C signal is small in video signal a1, satisfactory horizontal resolution is obtained. Also, since the BPF and the C signal comb filter circuit are not connected in series, control of gain and phase for both circuits together is not required. Moreover, a second-order filter may be used for the BPF, and thus there is little gain randomness or phase randomness. For this reason, the BPF and the C signal comb filter circuit can be used without controls. By this means, the manufacturing cost of equipment which include the disclosed luminance signal/color signal separator circuit can be reduced. In the embodiment in FIG. 1, BPF 12 is used as the means for passing the C-band components of video signal a1 including the color secondary carrier wave and other signals in the C-band frequencies of video signal a1. However, if some degree of gain and phase control is exercised, a high pass filter may be used.

When using this invention, a broad-band luminance signal can be obtained without connecting the band-pass filter and the color signal comb filter circuit in series. Therefore, control of the gain and phase for both together is not required. Moreover, a second-order filter may be used for the band-pass filter, and thus there is little gain randomness or phase randomness. For at least this reason the band-pass filter and the color signal comb filter circuit can be used without controls. By this means, the manufacturing cost of equipment which include this luminance signal/color signal separator circuit can be reduced. Furthermore, high resolution signals can be obtained when separating a video signal in which the color signal level is small.

Having described preferred embodiments of a novel luminance signal/color signal separator circuit, and a method for separating signals, which are intended to be illustrated and not limiting, it is noted that modifications and variations can be made by persons skilled in the art in light of the above teachings. For example, other filter circuits may be substituted for BPF 12. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the following claims.

What is claimed is:

1. A separator circuit to process a composite input signal into a first output signal based on a second output signal, the composite input signal being a combination of a first input signal characterized by a first frequency range and a second input signal characterized by a second frequency range, the first frequency range overlapping the second frequency range, the separator circuit comprising:

first circuitry to generate a detection signal corresponding to an amplitude of the second output signal;

second circuitry to generate a third signal from the composite input signal, the third signal being characterized by a third frequency range and scaled according to the detection signal, the third frequency range containing the second frequency range;

third circuitry to generate the first output signal from a combination of the third signal and the composite input signal; and fourth circuitry to generate the second output signal from the composite input signal, the fourth circuitry including a comb filter.

2. The separator circuit of claim 1, wherein:

the first input signal is further characterized by a first signal amplitude;

the second output signal is characterized by a second signal amplitude;

the first output signal includes a signal component characterized by a component frequency range contained within the third frequency range; and the third circuitry generates the first output signal having an amplitude of the signal component as (1) a first component amplitude when the second signal amplitude is a first amplitude and (2) a second component amplitude when the second signal amplitude is greater than the first amplitude, the first component amplitude being greater than the second component amplitude.

3. The separator circuit of claim 1, wherein the third circuitry includes combining circuitry to generate the first output signal by subtracting the third signal from the composite input signal.

4. The separator circuit of claim 1, wherein the first circuitry includes an amplitude detector to generate the detected signal.

5. The separator circuit of claim 1, wherein the second circuitry includes:

a filter to generate an intermediate signal from the composite input signal, the intermediate signal being characterized by the third frequency range; and fifth circuitry to generate the third signal from the intermediate signal, the fifth circuitry controlling an amplitude of the third signal based on a function of the detection signal.

6. The separator circuit of claim 5, wherein the fifth circuitry includes a scalable attenuator, the scalable attenuator attenuating the intermediate signal by an attenuation proportional to an amplitude of the detection signal to produce the third signal.

7. A separator circuit having an input terminal, a first output terminal and a second output terminal, the separator circuit comprising:

an amplitude detector having an input connected to the second output terminal;

a filter having a first input connected to the input terminal and a second input connected to an output of the amplitude detector;

a combiner having an output connected to the first output terminal, a first input connected to the input terminal and a second input connected to an output of the filter; and a comb filter connected between the input terminal and the second output terminal.

8. A separator circuit having an input terminal, a first output terminal and a second output terminal, the separator circuit comprising:

an amplitude detector having an input connected to the second output terminal;

a filter having a first input connected to the input terminal and a second input connected to an output of the amplitude detector; and a combiner having an output connected to the first output terminal, a first input connected to the input terminal and a second input connected to an output of the filter, wherein the filter outputs a signal at the output of the filter as an amplitude scaled replica of a signal at the first input of the filter, the amplitude scaling depending on a signal at the second input of the filter.

9. In a separator circuit for processing a composite input signal into first and second output signals, the composite input signal including a first input signal characterized by a first signal amplitude and first frequency range combined with a second input signal characterized by a second signal amplitude and a second frequency range, a method comprising steps of:

generating a detection signal corresponding to an amplitude of the second output signal;

filtering the composite input signal to generate a third signal, the third signal being characterized by a third frequency range and scaled according to the detection signal, the third frequency range being greater than the second frequency range;

combining the third signal and the composite input signal to generate the first output signal; and generating the second output signal from the composite input signal in a comb filter.

10. The method of claim 9, wherein:

the first output signal includes a signal component characterized by a component frequency range contained within the third frequency range;

the step of combining includes outputting the first output signal having an amplitude of the signal component as (1) a first component amplitude when the second signal amplitude is a first amplitude and (2) a second component amplitude when the second signal amplitude is greater than the first amplitude, the first component amplitude being greater than the second component amplitude.

* * * * *